United States Patent Office 3,115,395
Patented Dec. 24, 1963

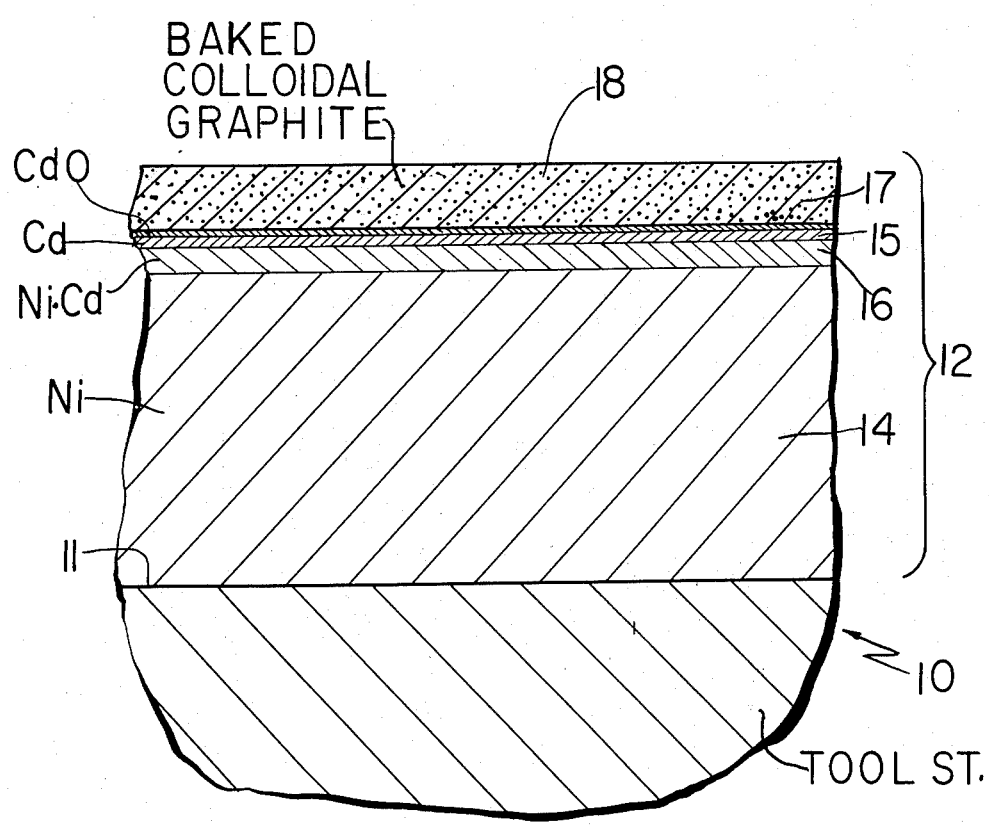

3,115,395
HIGH TEMPERATURE LUBRICATED BEARING SURFACE AND METHOD OF MAKING THE SAME
John W. Putt, Newark, and Robert Thomann, Jr., Teaneck, N.J., assignors to Specialties Development Corporation, Belleville, N.J., a corporation of New Jersey
Filed June 14, 1962, Ser. No. 202,580
6 Claims. (Cl. 29—183)

The present invention relates to the lubrication of bearing surfaces of machine elements, and, more particularly, to an improved lubricated bearing surface capable of withstanding high temperatures and the method of making such lubricated bearing surface.

At present, there are many applications of use which require that bearing surfaces of machine elements function at temperatures ranging from about −65° F. to about 1000° F. An example of such application is the use of actuators for controlling jet engine burners wherein lubricated ball bearing screw thread and thrust bearing components are exposed to such temperatures. Consequently, the lubrication of such components to assure proper operation thereof over a considerable period of time without structural damage thereto has been a formidable problem.

Heretofore, greases and liquid lubricants were found to be inadequate to provide for operation over the wide range of temperatures. Also, dry lubricants of the type used for less stringent high temperature applications were found to be inadequate because the extreme temperatures and force level reached during operation of the actuators were far in excess of the capabilities of dry lubricants such as graphite, molybdenum disulfide and silver combined with various binders. For example, the oxidation rate for molybdenum disulfide increases exponentially above 750° F. Silver has a tendency to transfer to mating working surfaces at high temperatures. Graphite is not an effective lubricant in dry environments up to 700° F. Furthermore, dry lubricants are poor barriers to corrosion.

Accordingly, an object of the present invention is to provide lubricated bearing surfaces which are not subject to the foregoing difficulties.

Another object is to provide such lubricated bearing surfaces which are effective over a long duration of time at extreme temperatures and all intermediate temperatures within the range of −65° F. to 1000° F. to protect bearing components against structural damage whereby stringent service specifications can be satisfied.

Another object is to provide an improved method for producing such lubricated bearing surfaces and for reconditioning these surfaces to extend the useful service life of the bearing components.

A further object is to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, it has been discovered that the foregoing objects can be accomplished by providing a lubricated bearing surface for use on cooperating machine elements composed of tool steel and/or tungsten carbide for example which surface comprises a layer of nickel on a working surface of at least one of the machine elements, an oxidized layer of cadmium on the layer of nickel and diffused therein, and a coating of colloidal graphite adhered on the layer of cadmium.

It has been found that the nickel-cadmium diffusion provides a cadmium oxide surface film and that the coating of a film of graphite thereon produces a cadmium oxide-graphite lubricant which functions over the −65° F. to 1000° F. range. Also, the cadmium oxide film acts as an adjunct for retarding oxidation of the graphite. The nickel-cadmium diffusion layer between the layers of nickel and cadmium provides a very effective barrier to high temperature oxidation and chemical corrosion to tool steel.

In the drawing, the single FIGURE is a magnified fragmentary sectional view of the lubricated bearing surface in accordance with the present invention applied to the working surface of a tool steel bearing element.

Referring now to the drawing in detail, a small section of a bearing element 10 is shown which has a working surface 11 provided with a lubricating surface 12. The lubricating surface 12 comprises a layer of nickel 14 on the working surface 11, a layer of cadmium 15 on the layer of nickel which is diffused in the nickel at 16 and is oxidized at least on its outer surface 17, and a coating of colloidal graphite 18 adhered on the layer of cadmium.

The lubricating surface 12 is provided by a deposit or plating of nickel on the tool steel surface 11, a deposit or plating of cadmium on the nickel, heating in air at a temperature to diffuse the cadmium in the nickel at 16 and to oxidize the cadmium at 17, applying a coating of colloidal graphite dispersion on the cadmium, and baking the dispersion to cause the graphite to adhere to the cadmium.

As a specific example of the present invention, the screw threads of the screw and nut and thrust ball bearing race components of a ball screw actuator were provided with the lubricated bearing surface in the manner about to be described. The screw and nut and races of this actuator were constructed of $M_2$ steel, and the bearing balls were constructed of tungsten carbide steel.

The working surfaces of the screw threads and races were vapor blasted with 125 mesh aluminum oxide grit to provide a clean 20–30 (root mean square) finish equivalent to about a satin finish.

A 0.001 inch layer of electroless nickel was plated on the cleaned surface in a conventional manner by following well known electroless plating techniques to obtain a uniform layer on irregular shapes, superior corrosion resistance and greater hardness. However, other techniques may be employed to provide the nickel layer.

A 0.0001 inch layer of electrolytic cadmium was then electroplated on the nickel layer. Preferably, the cadmium is applied within thirty minutes after application of the nickel to assure adhesion of the cadmium on the nickel. However, if this is not feasible, the surface of the nickel layer may be reconditioned by electrolytically flash plating the nickel surface (Woods' nickel strike).

Immediately after the cadmium plating operation, the actuator components were heated at 630° F. for one hour in an air circulating oven to diffuse the cadmium into the nickel. This heating step was followed by heating the components at 750° F. for two hours in an air circulating oven to give the nickel-cadmium cladding maximum hardness. During these heating steps, the presence of oxygen in the circulated air effected oxidation of the cadmium layer at its outer surface.

The actuator components were then cooled to about room temperature, and a 0.0002 inch coating of a dispersion colloidal graphite in a volatile fluid was applied to the oxidized cadmium surface of the cadmium layer. The components were baked at 300° F. for one hour to adhere the graphite onto the cadmium oxide.

The lubricated actuator components and the ball bearings were assembled with other actuator elements, and the assembled actuator was subjected to a test for 100 hours simulating actual service conditions. During this 100 hour test, the actuator was operated to simulate 50,000 revolutions of the screw with respect to its nut with an axial force of 3000 pounds applied to the actuator during the first 50 hours and with an axial force of 5000 pounds applied during the second 50 hours.

The actuator was operated at 70° F. for the first five hours, 500° F. for the next five hours, 850° F. for the next fifteen hours, 1000° F. for the next fifty hours, 850° F. for the next fifteen hours, 70° F. for the next eight hours and −65° F. for the next (and last) two hours. The mechanical efficiency of the actuator which takes into account friction losses in the bearings initially was about 87%. The efficiency decreased to about 56% after the first fifty hours of the test whereupon the nut and screw components were relubricated to restore the actuator efficiency to about 80%. During the next twenty five hours of the test (at 1000° F.), the efficiency decreased to about 58% and the nut and screw components were again relubricated to restore the actuator efficiency to about 79%. During the next (and last) twenty five hours of the test, the efficiency decreased to about 61%.

Relubrication of the actuator components is effected by vapor grit blasting the same to clean and activate the surface and re-applying nickel plate until the original surface thickness of nickel has been obtained, re-applying cadmium, diffusing the layer of cadmium into the nickel, re-heat treating for maximum nickel hardness and re-applying the graphite top coat and re-baking to band the graphite to the surface.

At the completion of the 100 hour test, the nut and screw components were cleaned again and were microscopically examined. No structural damage to the components was observed, whereby it was clearly established that the lubricated surfaces in accordance with the present invention enable the components to meet service life requirements.

From the foregoing description, it will be seen that the present invention provides improved lubricated bearing surfaces in a simple, practical and economical manner.

It will be understood that the details and examples hereinbefore set forth are illustrative only and that the invention as broadly described and claimed is in no way limited thereby.

We claim:

1. A lubricated bearing surface for use on machine elements at temperatures ranging from about −65° F. to about 1000° F., which surface comprises a layer of nickel on a working surface of a machine element, an oxidized layer of cadmium on said layer of nickel and diffused therein, and a coating of colloidal graphite adhered on said layer of cadmium.

2. A lubricated bearing surface for use on machine elements at temperatures ranging from about −65° F. to about 1000° F., which surface comprises a layer of electroless nickel on a tool steel working surface of a machine element, an oxidized layer of electrolytic cadmium on said layer of nickel and diffused therein, and a 0.0002 inch coating of colloidal graphite adhered on said layer of cadmium.

3. A method of making a lubricated bearing surface for use at temperatures ranging from about −65° F. to about 1000° F., which method comprises applying a layer of nickel on a working surface of a machine element, applying a layer of cadmium on the layer of nickel, oxidizing cadmium and diffusing cadmium in the layer of nickel, and adhering a coating of colloidal graphite on the layer of cadmium.

4. A method of making a lubricated bearing surface for use at temperatures ranging from about −65° F. to about 1000° F., which method comprises applying a layer of electroless nickel on a tool steel working surface of a machine element, applying a layer of electrolytic cadmium on the layer of nickel, oxidizing cadmium and diffusing cadmium in the layer of nickel, and adhering a 0.0002 inch coating of colloidal graphite on the layer of cadmium.

5. A method of making a lubricated bearing surface for use at temperatures ranging from about −65° F. to about 1000° F., which method comprises applying a layer of nickel on a working surface of a machine element, applying a layer of cadmium on the layer of nickel, oxidizing cadmium and diffusing cadmium in the layer of nickel, applying a coating of a colloidal graphite dispersion on the cadmium, and baking the dispersion to cause the graphite to adhere to the cadmium.

6. A method of making a lubricated bearing surface for use at a temperature ranging from about −65° F. to about 1000° F., which method comprises applying a 0.001 inch layer of electroless nickel on a tool steel working surface of a machine element, applying a 0.0001 inch layer of electrolytic cadmium on the layer of nickel, oxidizing and diffusing cadmium in the layer of nickel, applying a 0.0002 inch coating of a colloidal graphite dispersion on the cadmium, and baking the dispersion to cause the graphite to adhere to the cadmium.

References Cited in the file of this patent

UNITED STATES PATENTS

| | | |
|---|---|---|
| 2,157,155 | Work et al. | May 9, 1939 |
| 2,237,314 | Queneau et al. | Apr. 8, 1941 |
| 2,373,352 | Smart | Apr. 10, 1945 |
| 2,700,623 | Hall | Jan. 25, 1955 |